United States Patent
Huang et al.

(10) Patent No.: US 10,655,776 B2
(45) Date of Patent: May 19, 2020

(54) GIMBAL AND CAMERA APPARTUS

(71) Applicant: SZ DJI OSMO TECHNOLOGY CO., LTD., Shenzhen (CN)

(72) Inventors: Yongjie Huang, Shenzhen (CN); Zhongjie Zheng, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/393,637

(22) Filed: Apr. 24, 2019

(65) Prior Publication Data

US 2019/0249820 A1     Aug. 15, 2019

Related U.S. Application Data

(63) Continuation of application No. PCT/CN2016/103646, filed on Oct. 27, 2016.

(51) Int. Cl.
| | | |
|---|---|---|
| *F16M 13/04* | (2006.01) | |
| *F16M 11/12* | (2006.01) | |
| *H02K 11/215* | (2016.01) | |
| *F16M 11/18* | (2006.01) | |
| *G03B 17/56* | (2006.01) | |
| *H02K 29/08* | (2006.01) | |
| *H04N 5/232* | (2006.01) | |

(Continued)

(52) U.S. Cl.
CPC ........... *F16M 11/123* (2013.01); *F16M 11/18* (2013.01); *G03B 17/561* (2013.01); *H02K 11/215* (2016.01); *H02K 29/08* (2013.01); *H04N 5/2328* (2013.01); *F16M 2200/041* (2013.01); *H02K 1/146* (2013.01); *H02K 1/2786* (2013.01); *H02K 11/33* (2016.01)

(58) Field of Classification Search
CPC ........ F16M 13/04; F16M 11/08; F16M 11/10; F16M 11/12
USPC ........................................................ 396/421
See application file for complete search history.

(56) References Cited

U.S. PATENT DOCUMENTS

| | | |
|---|---|---|
| 2013/0093293 A1 | 4/2013 | Price et al. |
| 2014/0063470 A1 | 3/2014 | Li et al. |

FOREIGN PATENT DOCUMENTS

| | | |
|---|---|---|
| CN | 101012906 A | 8/2007 |
| CN | 203377747 U | 1/2014 |

(Continued)

OTHER PUBLICATIONS

World Intellectual Property Organization (WIPO), International Search Report for PCT/CN2016/103646, dated Jul. 27, 2017, 5 Pages.

*Primary Examiner* — Clayton E. LaBalle
*Assistant Examiner* — Fang-Chi Chang
(74) *Attorney, Agent, or Firm* — Anova Law Group, PLLC (57) ABSTRACT

A gimbal and a camera apparatus are provided. The gimbal includes an electric motor and a rotation bracket connected to the electric motor and driven by the electric motor to rotate. The electric motor includes a first body, a second body, a magnetic ring disposed in the first body, a position sensing assembly disposed in the second body, and a mechanical limit mechanism disposed between the first body and the second body to define a limiting position of the first body when rotating relative to the second body. A positioning structure is disposed at a pre-determined position of a magnetic field of the magnetic ring. When the first body rotates relative to the second body to the limiting position, (Continued)

the position sensing assembly is capable of sensing a predetermined magnetic field signal.

20 Claims, 7 Drawing Sheets (51) Int. Cl.
*H02K 1/14* (2006.01)
*H02K 11/33* (2016.01)
*H02K 1/27* (2006.01)

(56) References Cited

FOREIGN PATENT DOCUMENTS

| | | | |
|---|---|---|---|
| CN | 103825408 | A | 5/2014 |
| CN | 104885342 | A | 9/2015 |
| CN | 105207408 | A | 12/2015 |
| CN | 204901238 | U | 12/2015 |
| CN | 205377548 | U | 7/2016 |
| JP | 201615812 | A | 1/2016 |
| WO | 2015127741 | A1 | 9/2015 |
| WO | 2015133291 | A1 | 9/2015 |
| WO | 2016045009 | A1 | 3/2016 |

GIMBAL AND CAMERA APPARTUS

CROSS REFERENCE TO RELATED APPLICATIONS

This application is a continuation application of International Application No. PCT/CN2016/103646, filed on Oct. 27, 2016, the entire content is incorporated herein by reference.

TECHNICAL FIELD

The present disclosure relates to an electric motor, a gimbal including the electric motor, and a camera apparatus including the gimbal.

BACKGROUND

Many existing electric motors, such as gimbal motors, often use Hall-effect component to detect operation positions. Such gimbal motors are unable to determine the operation positions upon a power loss. Thus, after a power loss and before a power recovery for operation, the electric motors may have to go through an initialization process to determine the operation position. The existing electric motors may often be configured with mechanical limit mechanisms. During the initialization process, the electric motors may use the limiting positions of the mechanical limit mechanisms as references to determine an operation position.

During the initialization process, to avoid mistakenly using other obstacles for the limiting positions, the electric motors may be configured with two mechanical limit mechanisms at two limiting positions and may set a middle point between the two limiting positions as an initial operation position. During the initialization process, the electric motors may have to rotate in two directions to determine the two limiting positions. Obviously, the initialization time of the electric motors may then be extended, and the response speed of the gimbals may be reduced. Thus, the user experience may be degraded.

SUMMARY

One aspect of the present disclosure provides a gimbal, including an electric motor and a rotation bracket connected to the electric motor and driven by the electric motor to rotate. The electric motor includes a first body, a second body, a magnetic ring disposed in the first body, a position sensing assembly disposed in the second body, and a mechanical limit mechanism disposed between the first body and the second body to define a limiting position of the first body when rotating relative to the second body. A positioning structure is disposed at a pre-determined position of a magnetic field of the magnetic ring. When the first body rotates relative to the second body to the limiting position, the position sensing assembly is capable of sensing a pre-determined magnetic field signal.

Another aspect of the present disclosure provides a camera apparatus, including a gimbal and an image acquisition device connected to the gimbal and stabilized by the gimbal. The gimbal includes an electric motor and a rotation bracket connected to the electric motor and driven by the electric motor. The electric motor includes a first body, a second body, a magnetic ring disposed in the first body, a position sensing assembly disposed in the second body, and a mechanical limit mechanism disposed between the first body and the second body to define a limiting position of the first body when rotating relative to the second body. A positioning structure is disposed at a pre-determined position of a magnetic field of the magnetic ring. When the first body rotates relative to the second body to the limiting position, the position sensing assembly is capable of sensing a pre-determined magnetic field signal.

The following embodiments will further illustrate the present disclosure with the above accompanying drawings.

DETAILED DESCRIPTION OF THE EMBODIMENTS

Technical solutions of embodiments of the present disclosure will be described clearly and entirely with reference to the drawings of the embodiments of the present disclosure. Obviously, the described embodiments are some rather than all of the embodiments of the present disclosure. Other embodiments conceived by those having ordinary skills in the art on the basis of the described embodiments without inventive efforts should fall within the scope of the present disclosure.

It should be noted that, when one component is "fixed" to another component, the component may directly contact the another component, or may have something in-between. When one component is "connected" to another component, the component may directly connect to the another component, or may have something in-between. When one component is "configured" on another component, the component may be configured directly on the another component, or may have something in-between. The terms "vertical", "horizontal", "left", "right", and other similar expressions are intended for illustration purposes.

Unless otherwise specified, all the technical and scientific terms used in the embodiments of the present disclosure refer to the same meaning commonly understood by those skilled in the art. The terminologies used in the present disclosure are intended to describe specific embodiments, and not to limit the scope of the present disclosure. The term "and/or" includes any and all combinations of one or more of the listed items.

Various embodiments provide an electric motor, a gimbal, and a camera apparatus. For example, the electric motor may include a first body, a second body, a magnetic ring disposed in the first body, a position sensing assembly disposed in the second body, and a mechanical limit mechanism disposed between the first body and the second body to define a limiting position of the first body when rotating relative to the second body. A positioning structure is disposed at a pre-determined position of a magnetic field of the magnetic ring. When the first body rotates relative to the second body to the limiting position, the position sensing assembly is capable of sensing a pre-determined magnetic field signal. An exemplary gimbal may include an electric motor and a rotation bracket connected to the electric motor and driven by the electric motor to rotate. In addition, an exemplary camera apparatus may include a gimbal and an image acquisition device connected to the gimbal and stabilized by the gimbal.

Figure 1:
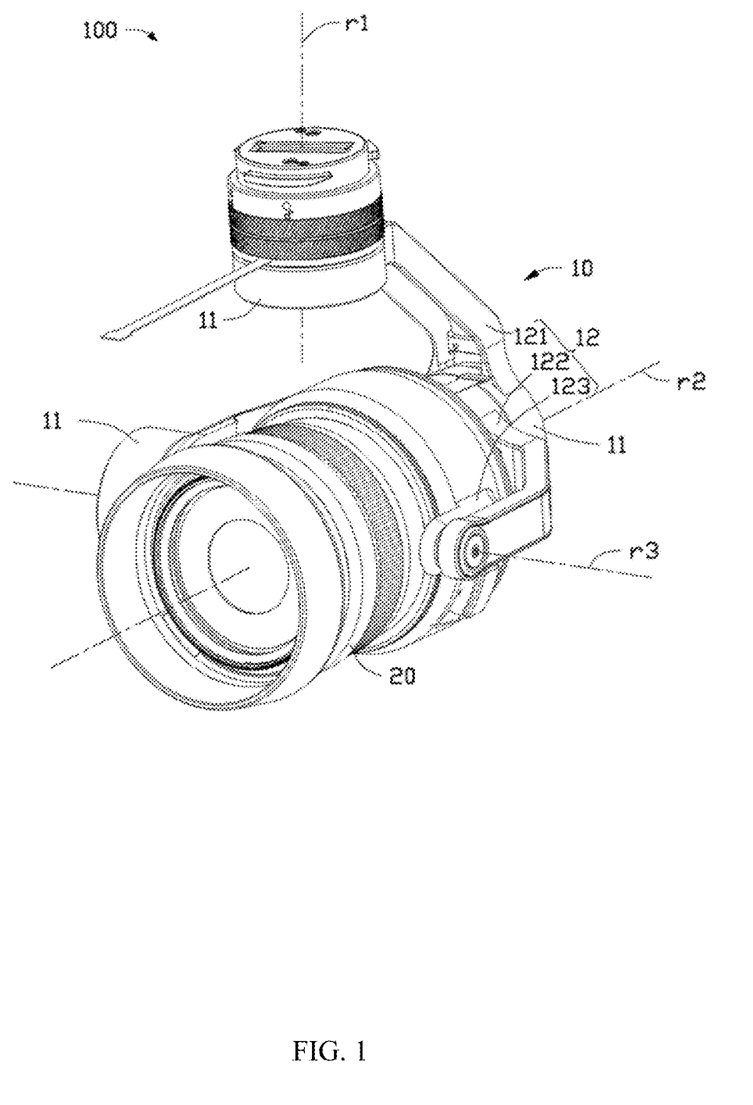
FIG. 1 is a 3-dimentinal schematic diagram of a camera apparatus according to some embodiments of the present disclosure.

Referring to FIG. 1, the camera apparatus 100 is used to capture photographs and/or videos. The camera apparatus 100 may be mounted on a holder (not shown). The holder may be any fixed object or movable object, for example, a building and a vehicle, etc. In some embodiments, the holder may be an unmanned aerial vehicle. The camera apparatus 100 may be mounted on the unmanned aerial vehicle to capture aerial photographs or videos. It should be understood that, under certain circumstances, the camera apparatus 100 can also be held by a user for handheld shooting.

The camera apparatus 100 may include a gimbal 10 and an image acquisition device 20 mounted on the gimbal 10. The image acquisition device 20 may be used to capture images and/or videos. The image acquisition device 20 may include a camera, a camcorder, or a portable electronic device having a camera function (e.g., a smart phone, a tablet computer, etc.) The gimbal 10 may stabilize the operation of the image acquisition device 20 and/or adjust orientation or angle of the image acquisition device 20. In some embodiments, the gimbal 10 may be a 3-axis gimbal. The gimbal 10 may adjust the image acquisition device 20 in three axes (pitch, roll, yaw). It should be understood that, the gimbal 10 may also be a 2-axis or 1-axis gimbal.

In some embodiments, the gimbal 10 may drive the image acquisition device 20 to rotate around a first axis r1, a second axis r2, and a third axis r3. In some embodiments, the first axis r1 may be the yaw axis of the gimbal 10, the second axis r2 may be the roll axis of the gimbal 10, and the third axis r3 may be the pitch axis of the gimbal 10. It should be understood that, because the gimbal 10 has various configurations, the first axis r1, the second axis r2, and the third axis r3 may not have unique mapping relationships with the yaw axis, the roll axis, and the pitch axis. For example, in certain configurations, the first axis r1 of the gimbal 10 may be the roll axis or the pitch axis, which will not be described in detail one by one.

The gimbal 10 may include an electric motor 11 and a rotation bracket 12. In some embodiments, the gimbal 10 may include three electric motors 11 corresponding to the three axes of the gimbal 10, namely, a first axis electric motor, a second axis electric motor, and a third axis electric motor. The gimbal 10 may include three rotation brackets 12, namely, a first axis rotation bracket 121 corresponding to the first axis electric motor, a second axis rotation bracket 122 corresponding to the second axis electric motor, and a third axis rotation bracket 123 corresponding to the third axis electric motor, respectively. The first axis electric motor may be connected to the first axis rotation bracket 121 to drive the first axis rotation bracket 121 to rotate around the first axis r1. The second axis electric motor may be connected to the second axis rotation bracket 122 to drive the second axis rotation bracket 122 to rotate around the second axis r2. The third axis electric motor may be connected to the third axis rotation bracket 123 to drive the third axis rotation bracket 123 to rotate around the third axis r3.

In some embodiments, the first axis electric motor, the second axis electric motor, and the third axis electric motor may have substantially same structures. One electric motor 11 is used as an example for the detail description of the structure. It should be understood that, the electric motor 11 structure described below is applicable to at least one of the first axis electric motor, the second axis electric motor, and the third axis electric motor.

Figure 2:
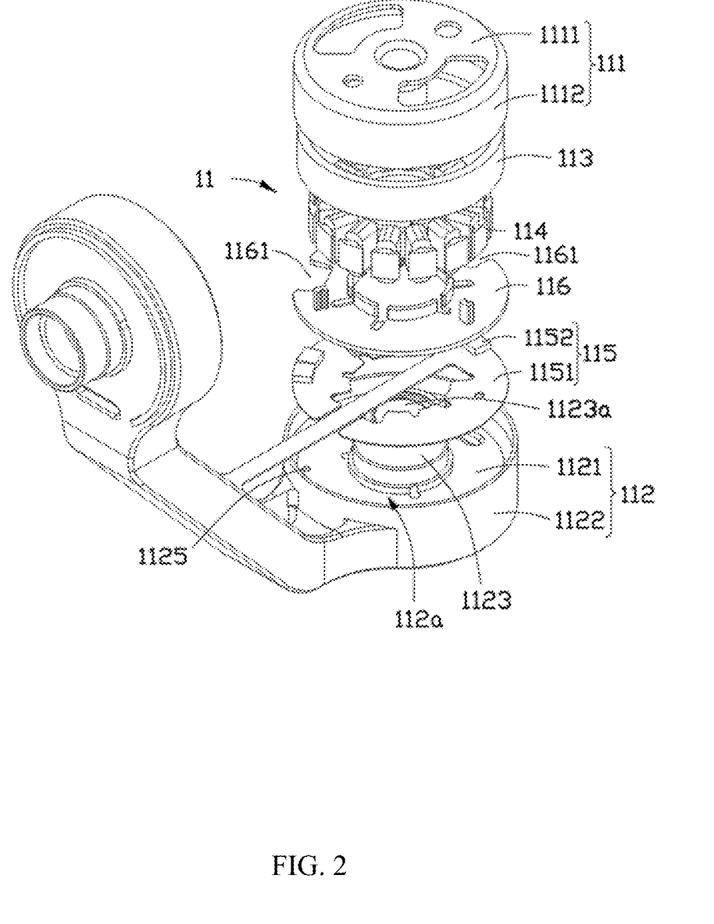
FIG. 2 is an exploded view of an electric motor of a camera apparatus shown in FIG. 1 according to some embodiments of the present disclosure.
Figure 3:
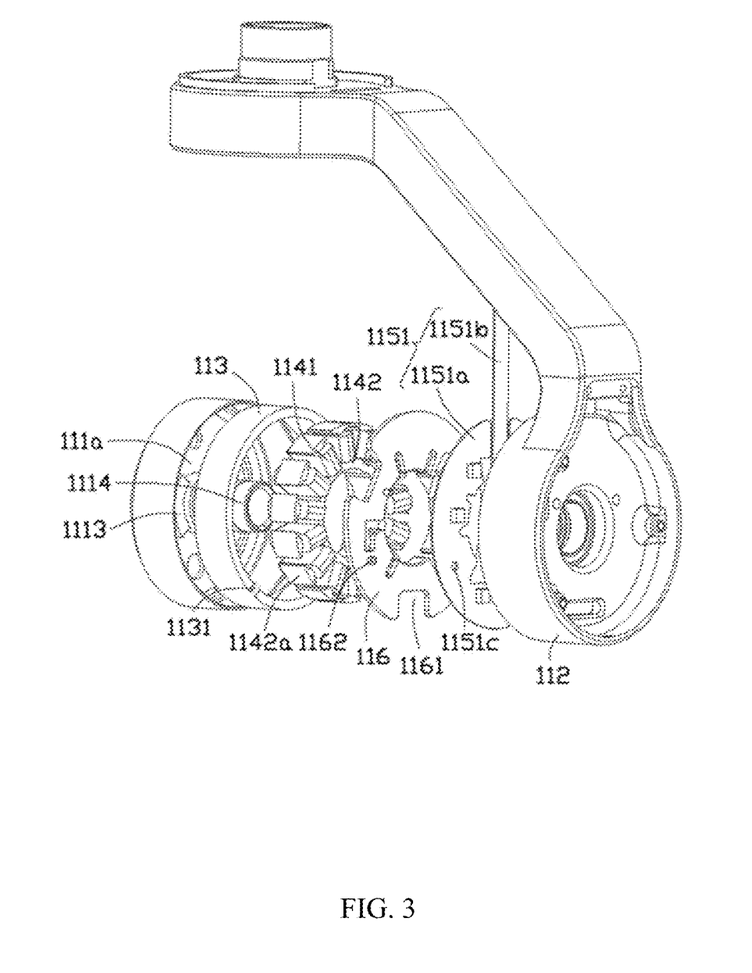
FIG. 3 is an exploded view of an electric motor shown in FIG. 2 from another angle according to some embodiments of the present disclosure.

Referring to FIG. 2 and FIG. 3, the electric motor 11 includes a first body 111, a second body 112, a magnetic ring 113, a coil winding 114, and a position sensing assembly 115. The first body 111 and the second body 112 are connected while rotating with each other. The magnetic ring 113 is fixedly disposed in the first body 111. The coil winding 114 and the position sensing assembly 115 are disposed in the second body 112. In some embodiments, the first body 111 and the magnetic ring 113 may form a rotor of the electric motor 11. The second body 112, the coil winding 114, and the position sensing assembly 115 may form a stator of the electric motor 11. Of course, the rotor and the stator are determined by the selected reference object. According to the fixing and mounting method of the electric motor 11 and the reference object differences, under certain circumstances, the rotor may become the stator. Accordingly, under certain other circumstances, the stator may become the rotor.

The first body 111 is substantially a hollow cylinder having an open end, and includes a first bottom wall 1111 and a first side wall 1112 connected to the first bottom wall 1111. The first bottom wall 1111 and the first side wall 1112 together form a first housing space 111a. In some embodiments, the first bottom wall 1111 is substantially vertically connected to the first side wall 1112.

The first body 111 also includes a first limiter 1113. The first limiter 1113 is coupled to the second body 112 to limit a rotation angle when the first body 111 rotates relative to the second body 112. In some embodiments, the first limiter 1113 protrudes from an inner surface of the first bottom wall 1111. The first limiter 1113 is substantially an arc-shaped protrusion.

It should be understood that the shape and disposed location of the first limiter 1113 are not limited to the embodiments as illustrated in the drawings. For example, the first limiter 1113 may also be a slice-shaped or a column-shaped protrusion. The first limiter 1113 may be formed on the first side wall 1112 or may be formed simultaneously on the first bottom wall 1111 and the first side wall 1112.

The first body 111 also includes a first shaft 1114. The first shaft 1114 and the second body 112 are capable of rotatably cooperating with each other, such that the first body 111 and the second body 112 are capable of rotatably connecting one to another. The first shaft 1114 is disposed on the inner surface of the first bottom wall 1111 and is connected to the first bottom wall 1111 vertically. In some embodiments, the first shaft 1114 and the first bottom wall 1111 may be formed in one piece. The first shaft 1114 is a hollow shaft. In some embodiments, the first limiter 1113 winds around an arc with respect to the axis of the first shaft 1114.

It should be understood that the first shaft 1114 and the first bottom wall 1111 may be formed separately, and may be connected to each other through snapping, riveting, bonding, or welding, etc.

Figure 4:
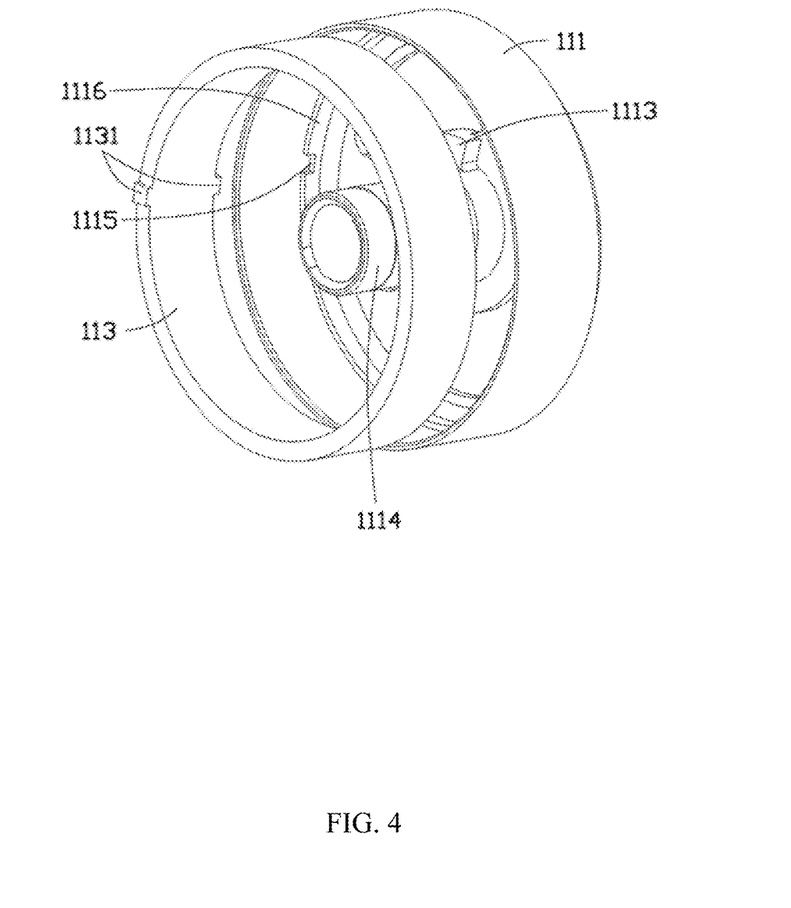
FIG. 4 is a view of a partial structure of an electric motor shown in FIG. 3 from another angle according to some embodiments of the present disclosure.

Referring to FIG. 4 at the same time, a first positioning structure 1115 is formed on the first body 111. The first positioning structure 1115 is used to determine a relative mounting position between the magnetic ring 113 and the first body 111. In some embodiments, the first positioning structure 1115 is a slot. Specifically, a step portion 1116 is formed in the first body 111. The step portion 1116 is annular-shaped. The inner diameter of the step portion 1116 is smaller than the inner diameter of the first side wall 1112, such that the step portion 1116 protrudes from the inner surface of the first side wall 1112. The first positioning structure 1115 is the slot formed on the step portion 1116. The first positioning structure 1115 is formed into a surface of the step portion 1116 facing away from the first bottom wall 1111.

It should be understood that the step portion 1116 may be omitted. The first positioning structure 1115 may be formed directly on the first bottom wall 1111.

The magnetic ring 113 is substantially annular-shaped. The magnetic ring 113 may form a magnetic field to drive the electric motor 11 to rotate. The magnetic ring 113 may be a multipole magnet, for example, a sextupole magnet or an octupole magnet, or an ordinary magnet. In some embodiments, the magnetic ring 113 may have a diameter slightly smaller than the inner diameter of the first side wall 1112. The magnetic ring 113 may be enclosed in the first housing space 111a. A second positioning structure 1131 may be formed on the magnetic ring 113. Specifically, the second positioning structure 1131 may include bumps formed on two opposite surfaces of the magnetic ring 113. A line connecting two centers of the two bumps may be substantially in parallel with a central axis of the magnetic ring 113. A bump located on a surface of the magnetic ring 113 facing toward the first bottom wall 1111 may match the first positioning structure 1115 to locate a mounting position of the magnetic ring 113 relative to the first body 111. In some embodiments, the two bumps may have a substantially same structure and shape.

The second positioning structure 1131 is formed in a position where a pre-determined magnetic field of the magnetic ring 113 is located. That is, the position of the second positioning structure 1131 has a pre-determined mapping relationship with the position of the magnetic field of the magnetic ring 113, which locates a position of the second positioning structure 1131 based on magnetic field distribution of the magnetic ring 113. In some embodiments, the second positioning structure 1131 is located at a peak-to-peak position of a certain pair of the magnetic poles of the magnetic ring 113, where a peak-to-peak signal strength is the greatest and a sensing signal of a magnetic sensor is saturated and overloaded.

It should be understood that the second positioning structure 1131 may also be formed in other positions relative to the magnetic ring 113 as long as the position of the second positioning structure 1131 has a pre-determined mapping relationship with a position of the magnetic field of the magnetic ring 113, and the position of the second positioning structure 1131 is determined by the magnetic field distribution of the magnetic ring 113.

The second body 112 is substantially a hollow cylinder having an open end, and includes a second bottom wall 1121 and a second side wall 1122 connected to the second bottom wall 1121. The second bottom wall 1121 and the second side wall 1122 together form a second housing space 112a. In some embodiments, the second bottom wall 1121 is substantially vertically connected to the second side wall 1122.

The second body 112 also includes a second shaft 1123. The second shaft 1123 is capable of rotatably cooperating with the first shaft 1114, such that the first body 111 and the second body 112 are rotatably connected to each other. The second shaft 1123 is disposed on an inner surface of the second bottom wall 1121 and is connected to the second bottom wall 1121 vertically. In some embodiments, the second shaft 1123 and the second bottom wall 1121 may be formed in one piece.

The second shaft 1123 is a hollow shaft. A matching hole 1123a is formed inside the second shaft 1123. The matching hole 1123a facilitates the first shaft 1114 to be inserted into the second shaft 1123 and to rotate relative to the second shaft 1123.

It should be understood that the second shaft 1123 and the second bottom wall 1121 may be formed separately, and may be connected to each other through snapping, riveting, bonding, or welding, etc.

Figure 6:
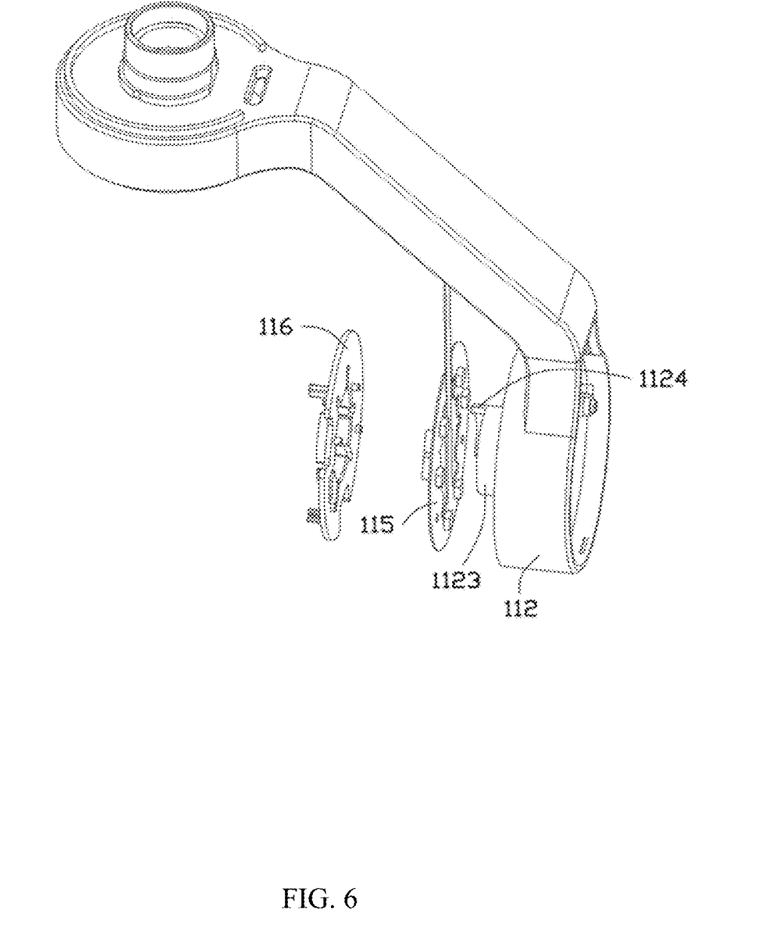
FIG. 6 is a view of another partial structure of an electric motor shown in FIG. 3 from another angle according to some embodiments of the present disclosure.

Referring to FIG. 6 at the same time, the second body 112 also includes a second limiter 1124. The second limiter 1124 is capable of cooperating with the first limiter 1113 to limit a rotation angle when the first body 111 rotates relative to the second body 112. In some embodiments, the second limiter 1124 is formed on an end surface of the second shaft 1123. The second limiter 1124 is substantially an arc-shaped protrusion.

It should be understood that the shape and disposed location of the second limiter 1124 are not limited to the embodiments as illustrated in the drawings. For example, the second limiter 1124 may also be a slice-shaped or a column-shaped protrusion. The second limiter 1124 may be formed on the second side wall 1122 or may be formed simultaneously on the second bottom wall 1121 and the second side wall 1122.

A plurality of mounting holes 1125 may be formed on the second body 112 to mount the position sensing assembly 115. In some embodiments, the plurality of mounting holes 1125 are blind holes, and include two mounting holes 1125. The two mounting holes 1125 are located on a same diameter line of the second shaft 1123. It should be understood that the number of the plurality of mounting holes 1125 and the distribution of the plurality of mounting holes 1125 may be adjusted to meet actual requirements, and will not be limited to the embodiments as illustrated in the drawings.

The coil winding 114 and the magnetic ring 113 together drive the first body 111 to rotate relative to the second body 112 by an electromagnetic force. The coil winding 114 includes coils 1141 and a coil bobbin 1142. The coils 1141 are disposed on the coil bobbin 1142. In some embodiments, the coil bobbin 1142 is ring-shaped, and includes a plurality of support portions 1142a extending in a radial manner. One coil 1141 is configured on each of the plurality of support portions 1142a.

The positioning sensing assembly 115 is used to sense the position of the electric motor and feeds sensing results back to a controller (not shown). The position sensing assembly 115 includes a base board 1151 and a plurality of position sensors 1152 disposed on the base board 1151. The base board 1151 is a circuit board. The plurality of position sensors 1152 are disposed on and electrically connected to the base board 1151. The base board 1151 includes a main board 1151a and an extension board 1151b connected to the main board 1151a. The plurality of position sensors 1152 are disposed on and electrically connected to the main board 1151a. The main board 1151a is substantially ring-shaped. The extension board 1151b is configured to transmit the sensing results of the plurality of position sensors 1152 to the controller. The extension board 1151b extends out of the electric motor 11 and connects to the controller. In some embodiments, the base board 1151 is a flexible circuit board. The base board 1151 is configured with a plurality of through-holes 1151c corresponding to the plurality of mounting holes 1125. When the base board 1151 is mounted on the second body 112, the plurality of through-holes 1151c align with the corresponding plurality of mounting holes 1125.

The plurality of position sensors 1152 may include a first position sensor 1152a and a second position sensor 1152b. The first position sensor 1152a and the second position sensor 1152b are magnetic sensors. In some embodiments, the first position sensor 1152a and the second position sensor 1152b are Hall-effect sensors. The first position sensor 1152a is an anchor sensor. The first position sensor 1152a is capable of sensing particular positions of the electric motor 11, for example, an initial position and a limiting position, etc. The second position sensor 1152b is capable of sensing a rotation angle of the electric motor 11 to provide references for driving the electric motor 11.

The first position sensor 1152a and the second position sensor 1152b are separated by a pre-determined angle. In some embodiments, the first position sensor 1152a and the second position sensor 1152b are separated by approximately 120°. It should be understood that the angle separating the first position sensor 1152a and the second position sensor 1152b is determined based on actual requirements and will not be limited by the embodiments as illustrated in the drawings.

The electric motor 11 also includes a pressing plate 116. The pressing plate 116 is used to press and fix the position sensing assembly 115 on the second body 112. The pressing plate 116 is substantially ring-shaped. The pressing plate 116 includes a plurality of knock-outs 1161. When the pressing plate 116 is pressed against the position sensing assembly 115, the plurality of knock-outs 1161 allow the pressing plate 116 to avoid the plurality of position sensors 1152. In some embodiments, the plurality of knock-outs 1161 may be the openings corresponding to the first position sensor 1152a and the second position sensor 1152b. Of course, based on the specific positions where the first position sensor 1152a and the second position sensor 1152b are disposed, the plurality of knock-outs 1161 may be holes.

The pressing plate 116 also includes a plurality of mounting posts 1162 corresponding to the plurality of mounting holes 1125. In some embodiments, the plurality of mounting posts 1162 protrude from a surface of the pressing plate 116 facing toward the position sensing assembly 115. Specifically, the plurality of mounting posts 1162 are cylinder-shaped. The plurality of mounting posts 1162 may match the plurality of mounting holes 1125. The pressing plate 116 may be made of an insulation material. In some embodiments, the pressing plate 116 may be made of a plastic material.

Figure 5:
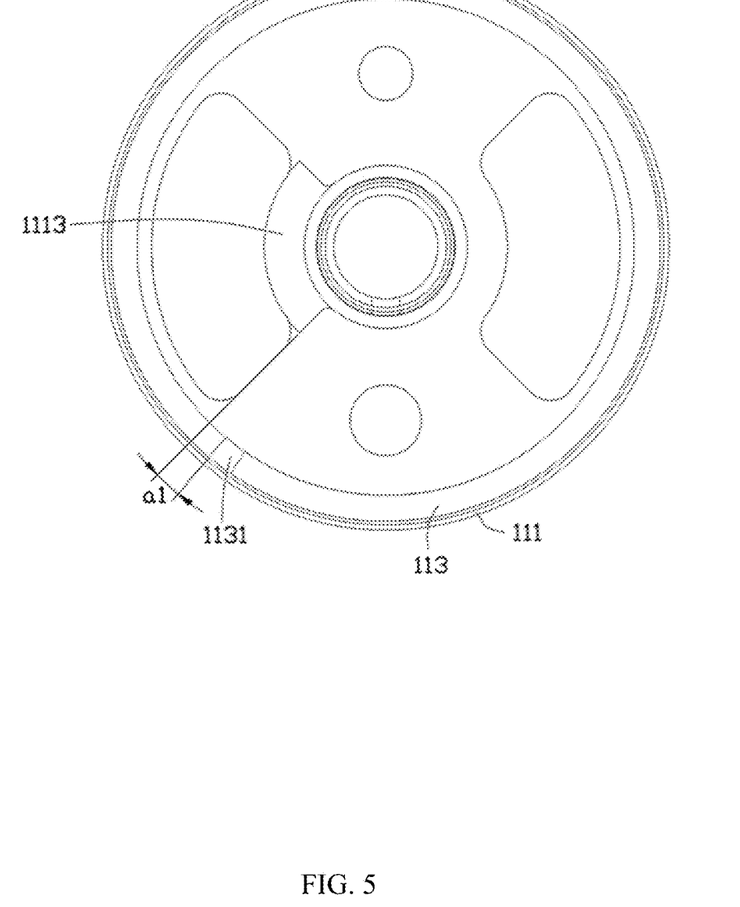
FIG. 5 is a main view of an assembled structure shown in FIG. 4 according to some embodiments of the present disclosure.

When being assembled, the magnetic ring 113 is mounted inside the first housing space 111a of the first body 111. The first positioning structure 1115 and the second positioning structure 1131 are mutually engaged to confine the magnetic ring 113 inside the first body 111. The second positioning structure 1131 is separated from an end of the first positioning structure 1113 adjacent to the second positioning structure 1131 by a pre-determined angle a1 (referring to FIG. 5). In some embodiments, the angle a1 is about 5°. Of course, the angle a1 may increase or decrease according to actual requirements. For example, the angle a1 can be as small as about 0°, or as great as over 10° or multiple of 10°, and will not be described in detail.

Figure 7:
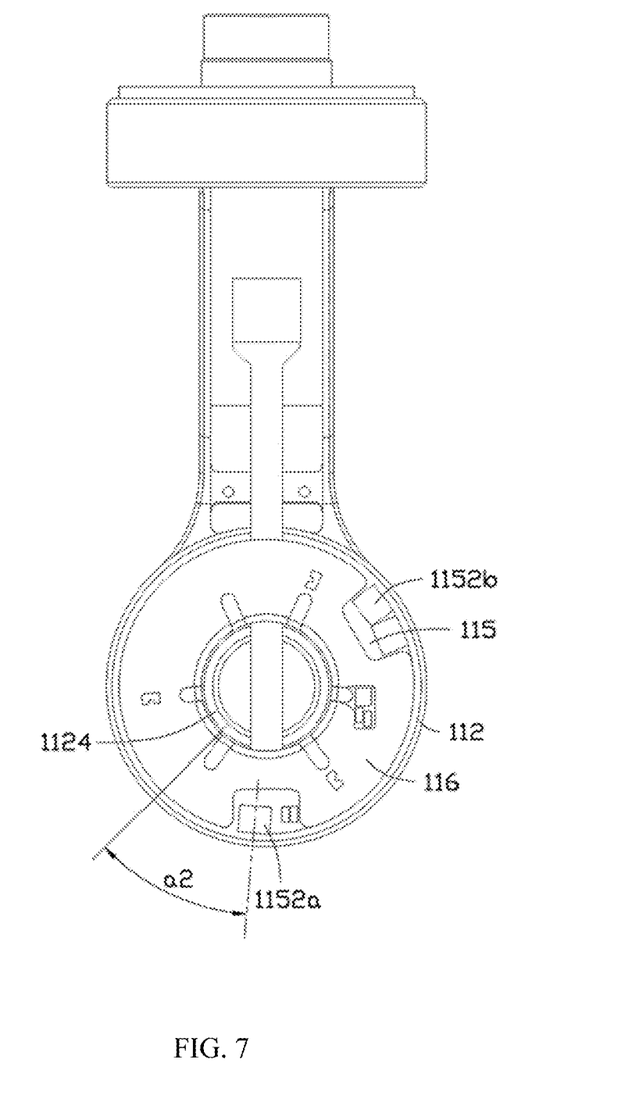
FIG. 7 is a main view of an assembled structure shown in FIG. 6 according to some embodiments of the present disclosure.

The positioning sensing assembly 115 is attached to the second shaft 1123 and is enclosed in the second housing space 112a of the second body 112. The pressing plate 116 is pressed on top of the position sensing assembly 115. The plurality of mounting posts 1162 penetrate through the corresponding plurality of through-holes 1151c to couple to the corresponding plurality of mounting holes 1125, such that the position sensing assembly 115 is fixed to the second shaft 112. The first position sensor 1152a is separated from an end of the second limiter 1124 adjacent to the first position sensor 1152a by a pre-determined angle a2 (referring to FIG. 7). In some embodiments, the angle a2 is about 40°. Of course, the angle a2 may increase or decrease according to actual requirements, and will not be described in detail. The coil winding 114 is securely mounted in the second housing space 112a of the second body 112.

The first body 111 is connected to the second body 112 and is able to rotate relative to the second body 112. The first shaft 1114 inserts into the matching hole 1123a of the second shaft 1123 and rotates relative to the second shaft 1123. The second positioning structure 1131 facilitates the adjustment of mounting positions of the first body 111 and the second body 112, and secures a relative position between the first limiter 1113 and the second limiter 1124. In some embodiments, when the first body 111 rotates in a certain direction relative to the second body 112 and the first limiter 1113 contacts with the second limiter 1124, the first position sensor 1152a moves to a position of the second positioning structure 1131 of the magnetic ring 113. The first limiter 1113 and the second limiter 1124 together form a mechanical limit mechanism of the electric motor 11. It should be understood that the electric motor 11 may be configured differently. For example, when the first body 111 rotates in an opposite direction relative to the second body 112 and the first limiter 1113 contacts with the second limiter 1124, the first position sensor 1152a moves to the position of the second positioning structure 1131 of the magnetic ring 113.

When in operation, the electric motor 11 needs to be initialized. The initialization process of the electric motor 11 includes the following steps. When the first body 111 rotates in a pre-determined initial direction relative to the second body 112 and the first limiter 1113 contacts with the second limiter 1124, the first position sensor 1152a moves to the position of the second positioning structure 1131 of the magnetic ring 113, and senses a pre-determined magnetic field strength. The sensing result of the first position sensor 1152a is used to determine whether the first limiter 1113 truly contacts with the second limiter 1124, such that the rotation of the electric motor 11 stopped by other obstacle is not mistakenly treated as reaching a limiting position. Thus, the electric motor 11 only needs to rotate in one direction to be accurately initialized, and substantially reduces the initialization time.

As such, in the disclosed electric motor for the gimbal and the camera apparatus, a positioning structure is disposed at a pre-determined position of a magnetic field of the magnetic ring, and a mechanical limit mechanism is in combination with a position sensing assembly to perform an initialization process. The initialization process is thus simplified, and the initialization time is reduced.

It should be understood that those skilled in the art can make other variations and the like in the spirit of the present disclosure for use in the design of the present disclosure as long as it does not deviate from the technical effects of the present disclosure. All changes made in accordance with the spirit of the present disclosure are intended to be included within the scope of the present disclosure.

What is claimed is:

1. A gimbal, comprising:
an electric motor; and
a rotation bracket connected to the electric motor and driven by the electric motor to rotate, wherein the electric motor includes:
a first body;
a second body;
a magnetic ring disposed in the first body;
a position sensing assembly disposed in the second body; and
a mechanical limit mechanism disposed between the first body and the second body to define a limiting position of the first body when rotating relative to the second body,
wherein:
a positioning structure is disposed at a pre-determined position of a magnetic field of the magnetic ring; and
when the first body rotates relative to the second body to the limiting position, the position sensing assembly is capable of sensing a pre-determined magnetic field signal.

2. The gimbal of claim 1, wherein:
the positioning structure includes two bumps formed on two opposite surfaces of the magnetic ring; and
one of the two bumps is coupled and snapped to the first body.

3. The gimbal of claim 2, wherein:
a line connecting centers of the two bumps is in parallel with a central axis of the magnetic ring.

4. The gimbal of claim 2, wherein:
a slot is configured on the first body; and
one of the bumps snaps into the slot.

5. The gimbal of claim 1, wherein:
the magnetic ring includes a multipole magnetic ring; and
the positioning structure is formed at a position having a peak-to-peak value of one pair of magnetic poles of the magnetic ring.

6. The gimbal of claim 1, wherein:
the first body includes a first bottom wall and a first side wall connecting to the first bottom wall;
the first bottom wall and the first side wall together form a first housing space; and
the magnetic ring is disposed in the first housing space and fixedly connected to the first body.

7. The gimbal of claim 6, wherein:
a first limiter is formed protruding from the first bottom wall;
a second limiter is formed on the second body and capable of cooperating with the first limiter; and
the first limiter and the second limiter together form the mechanical limit mechanism.

8. The gimbal of claim 1, wherein:
the first body includes a first shaft; and
the first shaft and the second body are capable of rotatably cooperating with each other, such that the first body and the second body are capable of rotatably connecting one to another.

9. The gimbal of claim 8, wherein:
the second body includes a second shaft; and
the first shaft is capable of rotatably inserting into the second shaft.

10. The gimbal of claim 9, wherein:
a first limiter is formed protruding from the first body;
a second limiter is formed on the second body and capable of cooperating with the first limiter;
the first limiter and the second limiter together form the mechanical limit mechanism;
the first limiter is disposed on a side of the first shaft; and
the second limiter is formed on an end surface of the second shaft.

11. The gimbal of claim 8, wherein:
the position sensing assembly includes a base board and a plurality of position sensors disposed on the base board;
the base board is fixedly disposed inside the second body;
the plurality of position sensors are capable of sensing the pre-determined magnetic field signal; and
based on the pre-determined magnetic field signal sensed by the position sensing assembly, the electric motor determines whether the first body rotates relative to the second body to the limiting position.

12. The gimbal of claim 11, wherein:
the base board includes a main board and an extension board connected to the main board;
the plurality of position sensors are electrically connected to the main board; and
the extension board is used to transmit sensing results of the plurality of position sensors to a controller.

13. The gimbal of claim 11, wherein:
the plurality of position sensors includes a first position sensor and a second position sensor;
the first position sensor is capable of sensing the pre-determined magnetic field signal; and
the second position sensor is capable of sensing a rotation angle of the electric motor to provide references for driving the electric motor.

14. A camera apparatus, comprising:
a gimbal; and
an image acquisition device connected to the gimbal and stabilized by the gimbal, wherein the gimbal includes:
an electric motor; and
a rotation bracket connected to the electric motor and driven by the electric motor to rotate, wherein the electric motor includes:
a first body;
a second body;
a magnetic ring disposed in the first body;
a position sensing assembly disposed in the second body; and
a mechanical limit mechanism disposed between the first body and the second body to define a limiting position of the first body when rotating relative to the second body,
wherein:
a positioning structure is disposed at a pre-determined position of a magnetic field of the magnetic ring; and
when the first body rotates relative to the second body to the limiting position, the position sensing assembly is capable of sensing a pre-determined magnetic field signal.

15. The apparatus of claim 14, wherein:
the positioning structure includes two bumps formed on two opposite surfaces of the magnetic ring; and
one of the two bumps is coupled and snapped to the first body.

16. The apparatus of claim 14, wherein:
the magnetic ring includes a multipole magnetic ring; and
the positioning structure is formed at a position having a peak-to-peak value of one pair of magnetic poles of the magnetic ring.

17. The apparatus of claim 14, wherein:
the first body includes a first bottom wall and a first side wall connecting to the first bottom wall;
the first bottom wall and the first side wall together form a first housing space; and
the magnetic ring is disposed in the first housing space and fixedly connected to the first body.

18. The apparatus of claim 14, wherein:
the first body includes a first shaft; and
the first shaft and the second body are capable of rotatably cooperating with each other, such that the first body and the second body are capable of rotatably connecting one to another.

19. The apparatus of claim 18, wherein:
the second body includes a second shaft; and
the first shaft is capable of rotatably inserting into the second shaft.

20. The apparatus of claim 19, wherein:
a first limiter is formed protruding from the first body;
a second limiter is formed on the second body and capable of cooperating with the first limiter;
the first limiter and the second limiter together form the mechanical limit mechanism;
the first limiter is disposed on a side of the first shaft; and
the second limiter is formed on an end surface of the second shaft.

* * * * *